United States Patent
Ogasawara et al.

(10) Patent No.: US 12,043,401 B2
(45) Date of Patent: Jul. 23, 2024

(54) TRANSMISSION COOLING ASSEMBLY OF HELICOPTER

(71) Applicant: KAWASAKI JUKOGYO KABUSHIKI KAISHA, Kobe (JP)

(72) Inventors: Kenta Ogasawara, Kobe (JP); Akira Hayasaka, Kobe (JP); Hiroki Yamamoto, Kobe (JP); Hidenori Arisawa, Kobe (JP); Yuji Shinoda, Kobe (JP); Mitsuaki Tanaka, Kobe (JP); Hironori Hashimoto, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 118 days.

(21) Appl. No.: 17/849,241

(22) Filed: Jun. 24, 2022

(65) Prior Publication Data
US 2022/0324581 A1    Oct. 13, 2022

Related U.S. Application Data

(63) Continuation of application No. PCT/JP2020/047287, filed on Dec. 17, 2020.

(30) Foreign Application Priority Data

Dec. 26, 2019  (JP) .................................. 2019-236611

(51) Int. Cl.
*B64D 33/08*    (2006.01)
*B64C 27/14*    (2006.01)

(52) U.S. Cl.
CPC .............. *B64D 33/08* (2013.01); *B64C 27/14* (2013.01)

(58) Field of Classification Search
CPC .......... B64D 33/08; B64D 35/00; B64C 27/14
USPC .......................................................... 244/116
See application file for complete search history.

(56) References Cited

U.S. PATENT DOCUMENTS

| | | | |
|---|---|---|---|
| 5,344,101 A | 9/1994 | Francois | |
| 2009/0071753 A1 | 3/2009 | Carnelli et al. | |
| 2010/0230530 A1 | 9/2010 | Nannoni et al. | |
| 2014/0090820 A1* | 4/2014 | Pisani | B64C 27/12 165/121 |
| 2014/0116652 A1* | 5/2014 | Ehinger | F28D 15/0208 165/104.21 |
| 2018/0087649 A1* | 3/2018 | Poster | F16H 57/0416 |

FOREIGN PATENT DOCUMENTS

| | | |
|---|---|---|
| JP | 2004-345602 A | 12/2004 |
| JP | 2007-008461 A | 1/2007 |
| JP | 2009-298399 A | 12/2009 |

OTHER PUBLICATIONS

International Search Report of PCT/JP2020/047287 dated Mar. 9, 2021 [PCT/ISA/210].

* cited by examiner

*Primary Examiner* — Brady W Frazier
(74) *Attorney, Agent, or Firm* — Sughrue Mion, PLLC

(57) ABSTRACT

A transmission cooling assembly of a helicopter includes: a transmission including a speed change structure that changes the speed of rotation produced by rotational power input from a prime mover and outputs the resulting rotational power and a housing accommodating the speed change structure; a cowl covering at least a part of an outer surface of the housing, with a gap defined between the cowl and the outer surface; and a flow structure that allows external air to flow through the gap.

6 Claims, 3 Drawing Sheets

TRANSMISSION COOLING ASSEMBLY OF HELICOPTER

CROSS-REFERENCE TO RELATED APPLICATION

The present application is a bypass continuation of PCT Filing PCT/JP2020/047287, filed Dec. 17, 2020, which claims priority to JP 2019-236611, filed Dec. 26, 2019, both of which are incorporated by reference in their entirety.

BACKGROUND OF THE INVENTION

1. Field of the Invention

The present disclosure relates to a transmission cooling assembly of a helicopter.

2. Description of the Related Art

For example, a transmission of a helicopter changes the speed of rotation produced by rotational power input from a prime mover and outputs the resulting rotational power. For the transmission to operate smoothly, it is common practice to supply a lubricating oil to the transmission by a lubricating system.

As disclosed in Japanese Laid-Open Patent Application Publication No. 2007-8461, the transmission of the helicopter is required to have the ability to continue operating for a certain period of time even in an abnormal situation where the lubricating oil is not supplied to the transmission by the lubricating system during flight (this situation may be referred to as "dry-run situation" hereinafter). In such an abnormal situation, the lack of supply of the lubricating oil could cause severe overheating of the transmission, thus making it difficult for the transmission to operate smoothly. This leads to shortening of the possible flight time in the abnormal situation.

SUMMARY OF THE INVENTION

A transmission cooling assembly of a helicopter according to one aspect of the present disclosure includes: a transmission including a speed change structure that changes the speed of rotation produced by rotational power input from a prime mover and outputs the resulting rotational power and a housing accommodating the speed change structure; a cowl covering at least a part of an outer surface of the housing, with a gap defined between the cowl and the outer surface; and a flow structure that allows external air to flow through the gap.

DESCRIPTION OF THE PREFERRED EMBODIMENTS

Figure 1:
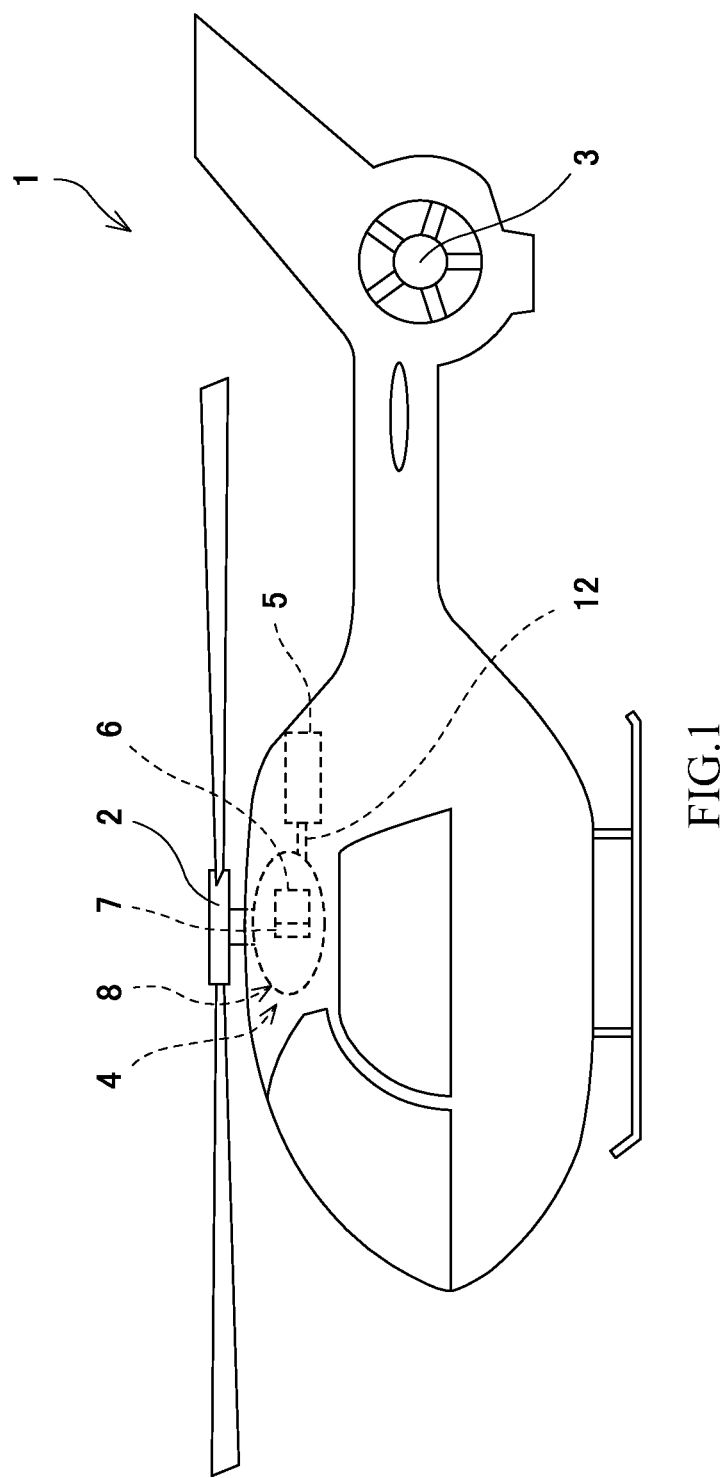
FIG. 1 is a schematic diagram of a helicopter according to an exemplary embodiment.
Figure 2:
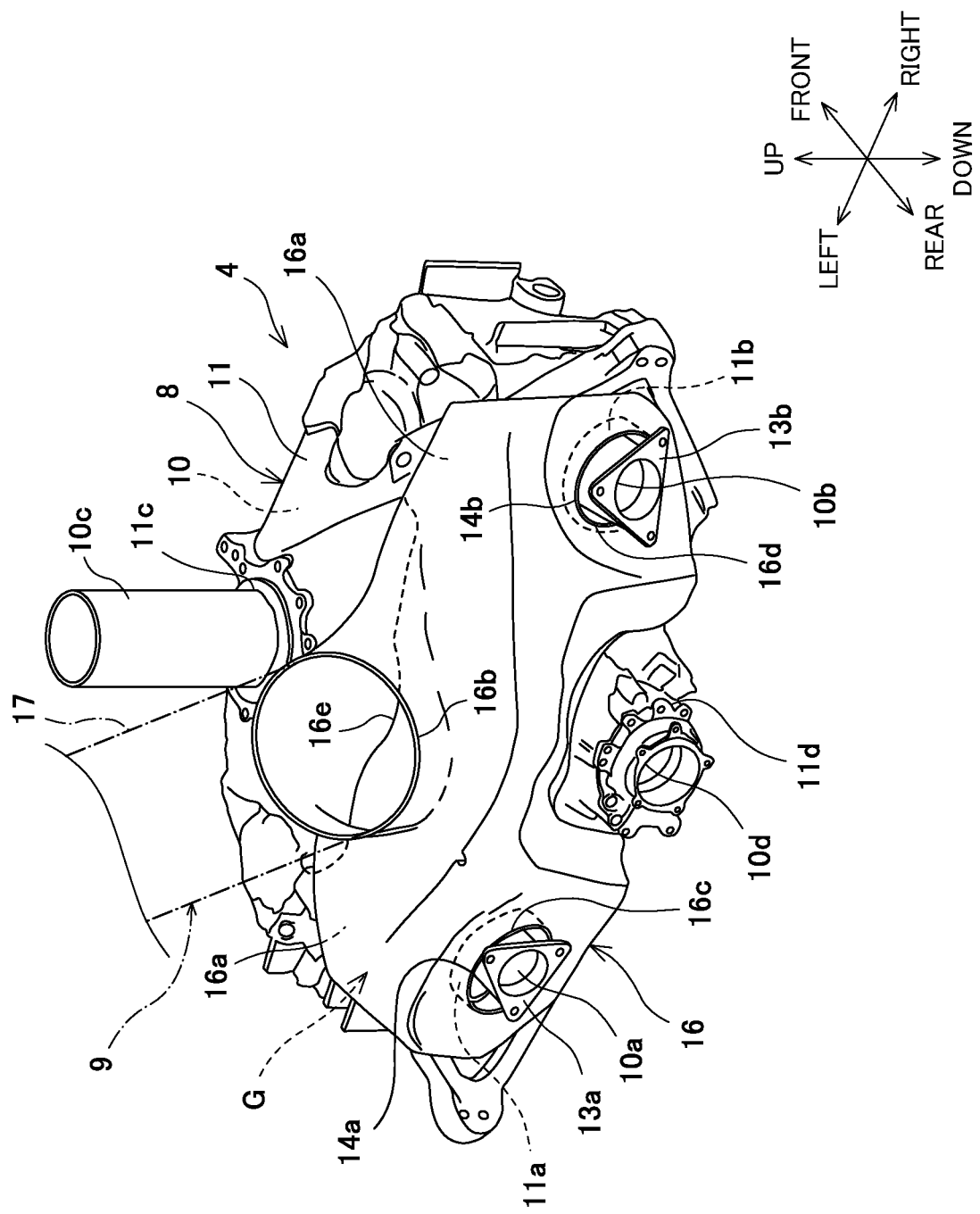
FIG. 2 is a rear perspective view of a transmission cooling assembly of FIG. 1.

Hereinafter, exemplary embodiments will be described with reference to the drawings. FIG. 1 is a schematic diagram of a helicopter 1 according to an exemplary embodiment. FIG. 2 is a rear perspective view of a transmission cooling assembly 4 of FIG. 1.

As shown in FIG. 1, the helicopter 1 includes a main rotor 2 and a tail rotor 3 which are connected to a transmission 8. The transmission cooling assembly 4 that cools the transmission 8 in a dry-run situation is disposed below the main rotor 2. A pair of left and right prime movers (such as turbines) 5 are disposed behind the main rotor 2. An oil cooler 6 and a fan 7 for oil cooler cooling are disposed in the vicinity of the transmission 8.

Figure 3:
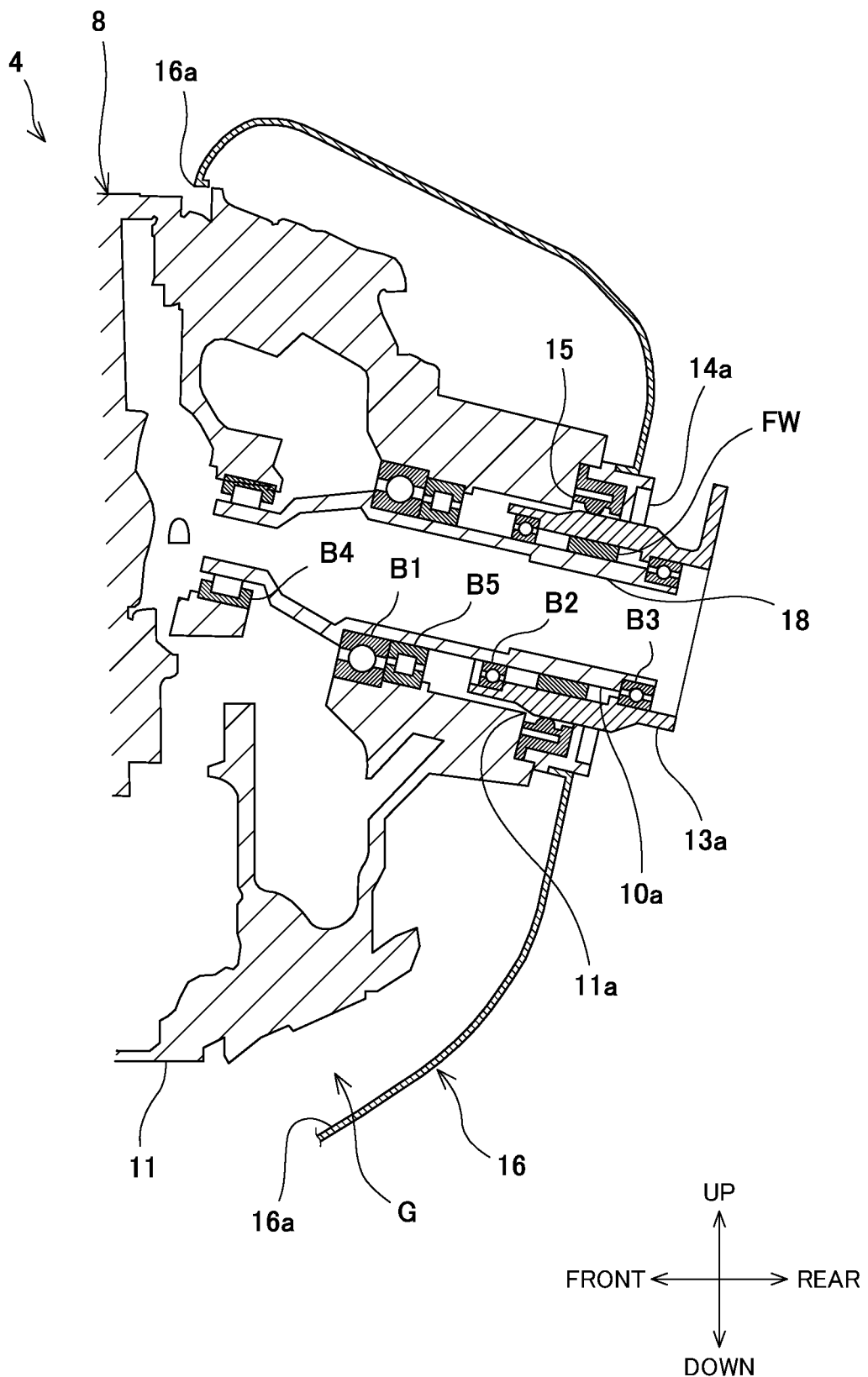
FIG. 3 is a schematic cross-sectional view showing bearings rotatably supporting an input structure of the transmission cooling assembly of FIG. 1.

The transmission cooling assembly 4 cools the transmission 8 with air. As shown in FIGS. 1 to 3, the transmission cooling assembly 4 includes the transmission 8, a cowl 16, and a flow structure 9. The transmission 8 includes a speed change structure 10, a housing 11, seal retainers 14a and 14b, and seals 15.

The speed change structure 10 changes the speed of rotation produced by rotational power input from at least one prime mover 5 of the helicopter and outputs the resulting rotational power. The speed change structure 10 of this exemplary embodiment changes the speed of rotation produced by rotational power input from the pair of prime movers 5 and outputs the resulting rotational power to the main rotor 2 and the tail rotor 3. The speed change structure 10 includes gears and rotating shafts. In normal situations, the gears and rotating shafts are lubricated with a lubricating oil supplied by a lubricating system of the helicopter 1.

The speed change structure 10 includes input structures 10a and 10b to which the rotational power is input from the prime movers 5. The speed change structure 10 further includes output structures 10c and 10d from which the rotational power is output to the outside of the speed change structure 10. The output structure 10c outputs the rotational power to the main rotor 2. The output structure 10d outputs the rotational power to the tail rotor 3. Each of the input structures 10a and 10b and output structures 10c and 10d includes, for example, a hollow shaft rotatable about its axis. For example, each of the input structures 10a and 10b includes: a hollow shaft 18 having gear teeth; a tubular structure 13a or 13b connected to an input shaft 12 described later; a free wheel clutch FW disposed between the hollow shaft 18 and the tubular structure 13a or 13b to transmit rotational power from the tubular structure 13a or 13b to the hollow shaft 18; and bearings B2 and B3 disposed between the hollow shaft 18 and the tubular structure 13a or 13b.

The housing 11 accommodates the speed change structure 10. The housing 11 includes: at least one opening (a pair of openings 11a and 11b in this exemplary embodiment) through which the rotational power from the prime mover 5 is input to the speed change structure 10 accommodated in the housing 11; and at least one opening (a pair of openings 11c and 11d in this exemplary embodiment) through which the rotational power resulting from speed change by the speed change structure 10 is output to the outside of the housing 11. The input structure 10a is located inside the opening 11a, and the input structure 10b is located inside the opening 11b. A part of the output structure 10c protrudes out of the opening 11c. The output structure 10d is located inside the opening 11d.

For example, the opening 11d and the pair of openings 11a and 11b are located at the rear of the housing 11. The pair of openings 11a and 11b are spaced from each other in the left-right direction, and the opening 11d is located between the pair of openings 11a and 11b. The opening 11c is located at the top of the housing 11.

The seal retainers 14a and 14b are attached to the openings 11a and 11b, respectively. The seal retainers 14a and 14b are fixed to the housing 11 by fasteners. The seals 15 are disposed in contact with the input structures 10a and 10b, respectively. The seals 15 prevent the oil from leaking out of the housing 11 through the openings 11a and 11b.

As shown in FIG. 1, the helicopter 1 further includes the input shaft 12 through which the rotational power from the prime movers 5 is transmitted to the speed change structure 10. In this exemplary embodiment, the prime movers 5 are connected to the input structures 10a and 10b of the speed change structure 10 by the input shaft 12. The transmission 8 includes at least one bearing supported by the housing 11 and rotatably supporting the input structure 10a or 10b. In this exemplary embodiment, the transmission 8 includes several such bearings, examples of which are ball bearings B1 and B4 and a roller bearing B5 (see FIG. 3). The bearings B1, B4, and B5 of this exemplary embodiment support the input structure 10a or 10b at their inner rings and are directly or indirectly supported at their outer rings by the housing 11.

As shown in FIG. 2, the cowl 16 covers at least a part of the outer surface of the housing 11, with a gap G defined between the cowl 16 and the outer surface of the housing 11. The gap G extends along the outer surface of the housing 11. For example, the gap G of this exemplary embodiment is not divided into separate portions. Thus, the gap G is continuous over the entire region between the outer surface of the housing 11 and the cowl 16. The cowl 16 is attached to the outer surface of the housing 11 with the aid of brackets. The flow structure 9 allows external air to flow through the gap G along the outer surface of the housing 11.

For example, the cowl 16 is disposed to cover an area of the outer surface of the housing 11, the covered area being an area the cooling of which with external air is effective to ensure a long dry-run time. The covered area of the outer surface varies depending on the characteristics such as the components, configuration, and size of the transmission 8. In this exemplary embodiment, that area of the outer surface of the housing 11 which is covered by the cowl 16 includes portions surrounding the peripheries of the input structures 10a and 10b.

Specifically, the cowl 16 includes introduction structures 16a through which external air is introduced into the gap G and a single discharge structure 16b through which the external air flowing through the gap G is discharged. The introduction structures 16a are located in both the left and right halves of the cowl 16 to introduce the external air into the gap G from the left and right ends and the upper and lower ends of the cowl 16.

The discharge structure 16b is located at the top of the cowl 16 and at the center of the cowl 16 in the left-right direction to discharge the external air introduced into the gap G from both the left and right of the cowl 16. The discharge structure 16b is connected to the flow structure 9. The discharge structure 16b is in the shape of, for example, a cylindrical tube, but not limited to having this shape. Alternatively, the cowl 16 may include a single introduction structure 16a and two or more discharge structures 16b.

The cowl 16 is a one-piece structure in this exemplary embodiment. The cowl 16 may be constructed by combining two or more components. The material of the cowl 16 can be selected as appropriate. The material of the cowl 16 is a resin in this exemplary embodiment, but may be another kind of material such as a metal.

The flow structure 9 of this exemplary embodiment includes an air intake path connected to the discharge structure 16b of the cowl 16 and a fan that forces the external air to flow from the gap G into the air intake path. A main cooling target other than the transmission 8 is located in the direction of air delivery by the fan (outlet), and the discharge structure 16b of the cowl 16 is connected to the air intake path through which the external air is drawn towards the fan (inlet). In this exemplary embodiment, for example, the main cooling target is the oil cooler 6.

The fan is the oil cooler-cooling fan 7 mounted in the helicopter 1, and the air intake path is an oil cooler-cooling air intake path 17 through which the air flows towards the fan 7. The fan of the flow structure 9 may deliver the air towards a main cooling target other than the oil cooler 6. The transmission cooling assembly 4 may include a flow structure 9 dedicated for allowing the external air to flow through the gap G, provided that conditions such as the weight and arrangement space of the transmission cooling assembly 4 are within permissible ranges.

In the transmission cooling assembly 4 of this exemplary embodiment, the input structures 10a and 10b are disposed in the flow paths of the external air flowing from the introduction structures 16a towards the discharge structure 16b through the gap G. Each of the input structures 10a and 10b is in the shape of a cylindrical tube and connected to the input shaft 12. The cowl 16 is disposed to surround the peripheries of the input structures 10a and 10b. In the transmission cooling assembly 4, the cowl 16 is disposed to allow the external air flowing through the gap G to cool the bearings B1, B4, and B5. The cowl 16 is shaped so as not to interfere with the opening 11d, and overlap between the cowl 16 and the opening 11d is avoided.

In this exemplary embodiment, the cowl 16 includes: a pair of openings 16c and 16d from each of which a part of a corresponding one of the pair of input structures 10a and 10b protrudes outside the cowl 16 when viewed from above; and a front wall 16e located at the front of the cowl 16 and between the openings 16c and 16d and extending in the up-down and left-right directions. The front wall 16e guides the external air flowing through the gap G towards the discharge structure 16b. Additionally, the front wall 16e prevents the external air from moving outside the cowl 16 from the front of the cowl 16 when flowing through the gap G. In the cowl 16 of this exemplary embodiment, which includes the front wall 16e, the pair of introduction structures 16a are spaced from each other in the left-right direction and associated respectively with the pair of input structures 10a and 10b.

As described above, the transmission cooling assembly 4 cools the transmission 8 using external air. This eliminates the need to use, for example, a liquid coolant or a circulation structure for circulation of the coolant. As such, the transmission cooling assembly 4 with a relatively low weight can be constructed at low cost. Additionally, the size of the arrangement space for the transmission cooling assembly 4 in the helicopter 1 can be reduced.

The cowl 16 may be in any shape that can cover the cooling target area of the housing 11. Thus, for example, the cowl 16 may be shaped to be symmetrical or asymmetrical in either the left-right or up-down direction. The cowl 16 may be disposed to cover a wide area of the outer surface of the housing 11 to the extent that the cowl 16 does not interfere with any other component.

FIG. 3 is a schematic cross-sectional view showing the bearings B1, B4, and B5 rotatably supporting the input structure 10a of the transmission cooling assembly 4 of FIG. 1. In particular, FIG. 3 shows a vertical cross-section of the housing 11 and cowl 16 taken along a plane including the axes of the bearings B1, B4, and B5 disposed inside the opening 11a. As shown in FIG. 3, the dimension of the gap G in a direction perpendicular to the outer surface of the housing 11 (this dimension may be referred to as "dimension D" hereinafter) is set large enough to allow the external air to flow through the gap G smoothly. The dimension D can be changed as appropriate, for example, to optimize the flow rate or flow velocity of the external air flowing through the gap G and maximize the heat transfer coefficient of the outer surface of the housing 11.

As described above, the transmission cooling assembly 4 of this exemplary embodiment can cool the housing 11 efficiently using external air flowing through the gap G defined between the housing 11 and the cowl 16. Thus, seizure of the speed change structure 10 accommodated in the housing 11 can be reduced even in the dry-run situation. As such, in the dry-run situation, the components of the speed change structure 10 (such as the bearings and gears mounted on the rotating shafts) can be prevented from suffering damages due to the transmission 8 being overheated as a result of seizure of the speed change structure 10. In the dry-run situation, therefore, shortening of the possible flight time due to overheating of the transmission 8 can be prevented, and the possible flight time can be made longer than ever before.

Specifically, for example, the lack of the lubricating oil in the dry-run situation could cause seizure of the toothed surfaces of the gears and hence an increased amount of heat generated in the transmission 8. Even in this case, the housing 11 can be cooled by the transmission cooling assembly 4 to reduce the increase in the amount of heat generated in the transmission 8 and thus make the dry-run time longer than ever before.

The cowl 16 includes: the introduction structures 16a through which the external air is introduced into the gap G; and the discharge structure 16b through which the external air flowing through the gap G is discharged, and the flow structure 9 includes: the air intake path 17 connected to the discharge structure; and the fan 7 that forces the external air to flow from the gap G into the air intake path 17. In this configuration, the external air can be forced to flow through the gap G towards the air intake path 17 leading to the fan 7, and the cooling effect of the external air on the transmission 8 can be enhanced. Additionally, the use of the air intake path 17 leading to the fan 7 can eliminate the need to dispose an additional structure for forcing the external air to flow through the gap G.

In this exemplary embodiment, the fan of the flow structure 9 is the fan 7 mounted in the helicopter 1 to cool the oil cooler. The use of the oil cooler-cooling fan 7 makes it possible, for example, to cool the oil cooler 6 by means of the fan 7 in normal situations and cool the transmission 8 by means of the fan 7 in the abnormal situation.

The speed change structure 10 includes the input structures 10a and 10b to which the rotational power from the prime movers 5 is input, and the input structures 10a and 10b are disposed in the flow paths of the external air flowing from the introduction structures 16a towards the discharge structure 16b through the gap G. Thus, the input structures 10a and 10b, which rotate at a relatively high speed and are likely to become hot, can be efficiently cooled using the external air flowing through the flow paths defined between the housing 11 and the cowl 16.

The cowl 16 is disposed to surround the peripheries of the input structures 10a and 10b. This can further enhance the efficiency with which the input structures 10a and 10b are cooled by the external air flowing through the gap G.

The prime movers 5 and the speed change structure 10 are connected by the input shaft 12 through which the rotational power from the prime movers 5 is transmitted to the input structures 10a and 10b of the speed change structure 10, the transmission 8 includes at least one bearing (bearings B1, B4, and B5 in this exemplary embodiment) supported by the housing 11 and rotatably supporting the input structure 10a or 10b, and the cowl 16 is disposed to allow the external air flowing through the gap G to cool the bearings B1, B4, and B5. Thus, overheating of the bearings B1, B4, and B5 can be reduced to enable the transmission 8 to operate smoothly even in the case where, for example, the input shaft 12 rotates at a relatively high speed. Additionally, in this exemplary embodiment, the bearings B2 and B3 can also be efficiently cooled by the external air flowing through the gap G, and the transmission 8 can operate more smoothly.

For example, in the case where the input structures 10a and 10b of the speed change structure 10 include gears (e.g., bevel gears) to which rotational power is transmitted from the input shaft 12 as in this exemplary embodiment, the bearings B1, B4, and B5 and the gears rotate at relatively high speeds and, for this reason, the helicopter 1 could be subjected to the harshest operation conditions in the dry-run situation. Even in such a case, the transmission cooling assembly 4 can efficiently cool the bearings B1, B4, and B5 and the gears by the external air via the outer surface of the housing 11. Thus, overheating of the transmission 8 can be prevented to make the dry-run time longer than ever before.

From the foregoing description, numerous modifications and other embodiments of the present disclosure are obvious to those skilled in the art. Accordingly, the foregoing description is to be construed as illustrative only, and is provided for the purpose of teaching those skilled in the art the best mode for carrying out the present disclosure. The structural and/or functional details may be substantially modified without departing from the scope of the present disclosure. The transmission cooling assembly 4 may include two or more cowls 16. In this case, the cowls 16 of the transmission cooling assembly 4 may have different shapes.

The discharge structure of the cowl 16 need not be connected to the air intake path. In the case where the discharge structure is not connected to the air intake path, the transmission cooling assembly may include, for example, a flow structure by which external air flowing from the front to the rear of the helicopter 1 during flight of the helicopter 1 is supplied to the introduction structures 16a of the cowl 16. The flow structure in this case may include, for example, a duct. The front wall 16e of the cowl 16 may be disposed at a location other than between the pair of openings 16c and 16d.

What is claimed is:

1. A helicopter comprising:
    a prime mover;
    a fuselage;
    a transmission including a speed change structure that changes the speed of rotation produced by rotational power input from the prime mover and outputs the resulting rotational power and a housing located inside the fuselage and accommodating the speed change structure;
    a cowl located inside the fuselage and mounted on the housing, the cowl covering at least a part of an outer surface of the housing, with a gap defined between an inner surface of the cowl and the outer surface of the housing; and a flow structure that allows external air to flow through the gap, wherein the cowl includes:
an introduction structure through which the external air is introduced into the gap; and
a discharge structure through which the external air flowing through the gap is discharged,
the flow structure includes:
an air intake path connected to the discharge structure; and
a first structure including a fan that forces the external air to flow from the gap into the air intake path, or a second structure by which the external air flowing from a front to a rear of the helicopter during flight of the helicopter is supplied to the introduction structure of the cowl.

2. The helicopter according to claim 1, wherein the flow structure includes the second structure and further includes a duct.

3. The helicopter according to claim 1, wherein the fan is a fan mounted to cool an oil cooler.

4. The helicopter according to claim 1, wherein
the speed change structure includes an input structure to which the rotational power from the prime mover is input, and
the input structure is disposed in a flow path of the external air flowing from the introduction structure towards the discharge structure through the gap.

5. The helicopter according to claim 4, wherein the cowl is disposed to surround a periphery of the input structure.

6. The helicopter according to claim 1, wherein
the prime mover and the speed change structure are connected by an input shaft through which the rotational power from the prime mover is transmitted to the speed change structure,
the transmission includes at least one bearing supported by the housing and rotatably supporting the input shaft, and
the cowl is disposed to allow the external air flowing through the gap to cool the bearing.

* * * * *